US012407204B2

(12) United States Patent
Tangudu et al.

(10) Patent No.: US 12,407,204 B2
(45) Date of Patent: Sep. 2, 2025

(54) ELECTRIC MACHINE HAVING ROTOR WITH INTEGRATED FAN

(71) Applicant: RTX Corporation, Farmington, CT (US)

(72) Inventors: Jagadeesh K. Tangudu, South Windsor, CT (US); Andrzej E. Kuczek, Bristol, CT (US); Joseph E. Turney, Amston, CT (US); Abbas A. Alahyari, Glastonbury, CT (US); Kimberly R. Saviers, Glastonbury, CT (US); Dmytro M. Voytovych, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 245 days.

(21) Appl. No.: 18/162,848

(22) Filed: Feb. 1, 2023

(65) Prior Publication Data

US 2024/0258851 A1 Aug. 1, 2024

(51) Int. Cl.

| | |
|---|---|
| ***H02K 1/16*** | (2006.01) |
| ***H02K 1/2786*** | (2022.01) |
| ***H02K 1/32*** | (2006.01) |
| ***H02K 9/06*** | (2006.01) |
| *B64D 27/30* | (2024.01) |

(52) U.S. Cl.

CPC ............. *H02K 1/2786* (2013.01); *H02K 1/16* (2013.01); *H02K 1/32* (2013.01); *H02K 9/06* (2013.01); *B64D 27/30* (2024.01)

(58) Field of Classification Search

CPC .......... H02K 1/2786; H02K 1/16; H02K 1/32; H02K 9/06

See application file for complete search history.

(56) References Cited

U.S. PATENT DOCUMENTS

| | | | | |
|---|---|---|---|---|
| 5,331,244 | A * | 7/1994 | Rabe ........................ | H02K 3/04 310/180 |
| 7,960,893 | B2 | 6/2011 | Kim et al. | |
| 9,853,522 | B2 | 12/2017 | Hasegawa et al. | |
| 9,923,420 | B2 | 3/2018 | Takemoto et al. | |
| 2008/0278020 | A1 * | 11/2008 | Ley ...................... | H02K 21/222 310/156.01 |

(Continued)

FOREIGN PATENT DOCUMENTS

| | | | |
|---|---|---|---|
| CN | 208539671 | U | 2/2019 |
| EP | 4071983 | A1 | 10/2022 |

(Continued)

OTHER PUBLICATIONS

Extended European Search Report for EP Application No. 23213818.0, dated Jun. 12, 2024, pp. 1-10.

*Primary Examiner* — Terrance L Kenerly

(74) *Attorney, Agent, or Firm* — CANTOR COLBURN LLP

(57) ABSTRACT

Aircraft may include electric motors. The aircraft electric motors may include a rotor assembly comprises an outer diameter portion, and inner diameter portion, and an end portion, arranged to define a stator cavity, and a rotor hub configured to connect to a shaft of the aircraft electric machine, a stator assembly arranged within the stator cavity, and at least one fan assembly arranged in the rotor assembly and configured to induce a cooling flow through the stator cavity.

20 Claims, 17 Drawing Sheets

(56) References Cited

U.S. PATENT DOCUMENTS

| | | | | |
|---|---|---|---|---|
| 2009/0212647 | A1* | 8/2009 | Zickermann | H02K 9/00 310/61 |
| 2010/0171378 | A1* | 7/2010 | Kim | H02K 1/14 310/216.118 |
| 2018/0138766 | A1* | 5/2018 | Moore | H02K 1/187 |
| 2020/0350791 | A1 | 11/2020 | Le et al. | |

FOREIGN PATENT DOCUMENTS

| | | | |
|---|---|---|---|
| JP | S533604 | A | 1/1978 |
| KR | 20120049836 | A | 5/2012 |
| WO | 2022091227 | A1 | 5/2022 |

* cited by examiner

ELECTRIC MACHINE HAVING ROTOR WITH INTEGRATED FAN

STATEMENT REGARDING FEDERALLY SPONSORED RESEARCH OR DEVELOPMENT

This invention was made with government support under Contract No. DE-AR0001351 awarded by the U.S. Department of Energy. The government has certain rights in the invention.

BACKGROUND

The present disclosure relates to electric motors, and more particularly, to electric motor assemblies with high efficiency and power density having improved cooling and structure for aircraft applications.

Traditional electric motors may include a stator and a rotor, with electrical motor windings in the stator that, when energized, drive rotation of the rotor about a central axis. Permanent magnet motors are widely used for high power density and efficient applications in aviation industry. The high torque density can be achieved by maximizing the magnetic loading through implementation of the Halbach array permanent magnet rotor structure; however, the dense permanent magnets can be a major barrier when minimizing the weight of the application. Accordingly, improved electric motor components may be used to improve the weight of such electric motors while also provide additional benefits, such as improved power density and the like.

BRIEF DESCRIPTION

According to some embodiments, aircraft electric motors are provided. The aircraft electric motors include a rotor assembly comprises an outer diameter portion, and inner diameter portion, and an end portion, arranged to define a stator cavity, and a rotor hub configured to connect to a shaft of the aircraft electric machine, a stator assembly arranged within the stator cavity, and at least one fan assembly arranged in the rotor assembly and configured to induce a cooling flow through the stator cavity.

In addition to one or more of the features described herein, or as an alternative, further embodiments of the electric motors may include that the at least one fan assembly is arranged at an outer diameter end of the end portion.

In addition to one or more of the features described herein, or as an alternative, further embodiments of the electric motors may include that the at least one fan assembly is arranged at an inner diameter end of the end portion.

In addition to one or more of the features described herein, or as an alternative, further embodiments of the electric motors may include that the at least one fan assembly comprises a first fan assembly arranged at an outer diameter end of the end portion and a second fan assembly arranged at an inner diameter end of the end portion.

In addition to one or more of the features described herein, or as an alternative, further embodiments of the electric motors may include that the at least one fan assembly comprises a plurality of fan blades, wherein the plurality of fan blades provide structural support and load transfer within the rotor assembly.

In addition to one or more of the features described herein, or as an alternative, further embodiments of the electric motors may include that an inner diameter end of the end portion, the inner diameter portion, and the rotor hub are coupled together at a hub junction.

In addition to one or more of the features described herein, or as an alternative, further embodiments of the electric motors may include a plurality of fasteners extending through and joining the end portion, the inner diameter portion, and the rotor hub together.

In addition to one or more of the features described herein, or as an alternative, further embodiments of the electric motors may include that the outer diameter portion is coupled to the end portion by a plurality of fasteners.

In addition to one or more of the features described herein, or as an alternative, further embodiments of the electric motors may include that the outer diameter portion comprises a set of outer diameter magnets, the inner diameter portion comprises a set of inner diameter magnets, and the end portion comprises a set of end portion magnets.

In addition to one or more of the features described herein, or as an alternative, further embodiments of the electric motors may include that the outer diameter magnets, the inner diameter magnets, and the end portion magnets are arranged in a substantially U-shaped configuration defining the stator cavity.

In addition to one or more of the features described herein, or as an alternative, further embodiments of the electric motors may include that the outer diameter portion comprises a flow control feature extending from an axial end of the outer diameter portion opposite the end portion of the rotor assembly, wherein the flow control feature is configured to direct a cooling flow into the stator cavity.

In addition to one or more of the features described herein, or as an alternative, further embodiments of the electric motors may include that the inner diameter portion comprises a flow control feature extending from an axial end of the inner diameter portion opposite the end portion of the rotor assembly, wherein the flow control feature is configured to direct a cooling flow into the stator cavity.

In addition to one or more of the features described herein, or as an alternative, further embodiments of the electric motors may include that the outer diameter portion comprises a first flow control feature extending from an axial end of the outer diameter portion opposite the end portion of the rotor assembly and the inner diameter portion comprises a second flow control feature extending from an axial end of the inner diameter portion opposite the end portion of the rotor assembly, wherein each of the first flow control feature and the second flow control features is configured to direct a cooling flow into the stator cavity.

In addition to one or more of the features described herein, or as an alternative, further embodiments of the electric motors may include that the stator assembly comprises a plurality of windings arranged within the stator cavity.

According to some embodiments, aircraft are provided. The aircraft may include at least one aircraft electric machine, at least one electrical device, and a power distribution system configured to distribute power from the at least one electric machine to the at least one electrical device. The at least one aircraft electric machine may include a rotor assembly comprises an outer diameter portion, and inner diameter portion, and an end portion, arranged to define a stator cavity, and a rotor hub configured to connect to a shaft of the aircraft electric machine, a stator assembly arranged within the stator cavity, and at least one fan assembly arranged in the rotor assembly and configured to induce a cooling flow through the stator cavity.

In addition to one or more of the features described herein, or as an alternative, further embodiments of the aircraft may include that the at least one fan assembly comprises at least one of a fan assembly arranged at an outer diameter end of the end portion and a fan assembly arranged at an inner diameter end of the end portion.

In addition to one or more of the features described herein, or as an alternative, further embodiments of the aircraft may include that the at least one fan assembly comprises a plurality of fan blades, wherein the plurality of fan blades provide structural support and load transfer within the rotor assembly.

In addition to one or more of the features described herein, or as an alternative, further embodiments of the aircraft may include that the outer diameter portion comprises a set of outer diameter magnets, the inner diameter portion comprises a set of inner diameter magnets, and the end portion comprises a set of end portion magnets.

In addition to one or more of the features described herein, or as an alternative, further embodiments of the aircraft may include that the outer diameter portion comprises a first flow control feature extending from an axial end of the outer diameter portion opposite the end portion of the rotor assembly and configured to direct a cooling flow into the stator cavity along an outer diameter surface of the stator assembly, and the inner diameter portion comprises a second flow control feature extending from an axial end of the inner diameter portion opposite the end portion of the rotor assembly and configured to direct a cooling flow into the stator cavity along an inner diameter surface of the stator assembly.

In addition to one or more of the features described herein, or as an alternative, further embodiments of the aircraft may include that the stator assembly comprises a plurality of windings arranged within the stator cavity.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
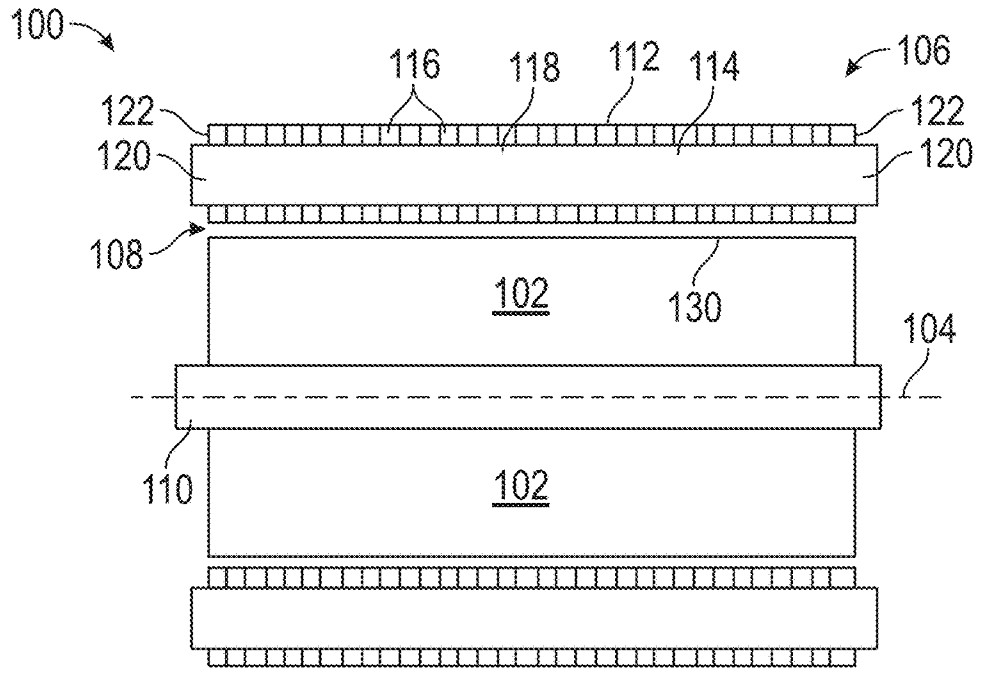
FIG. 1A is a partial view of an embodiment of electric motor.
Figure 1B:
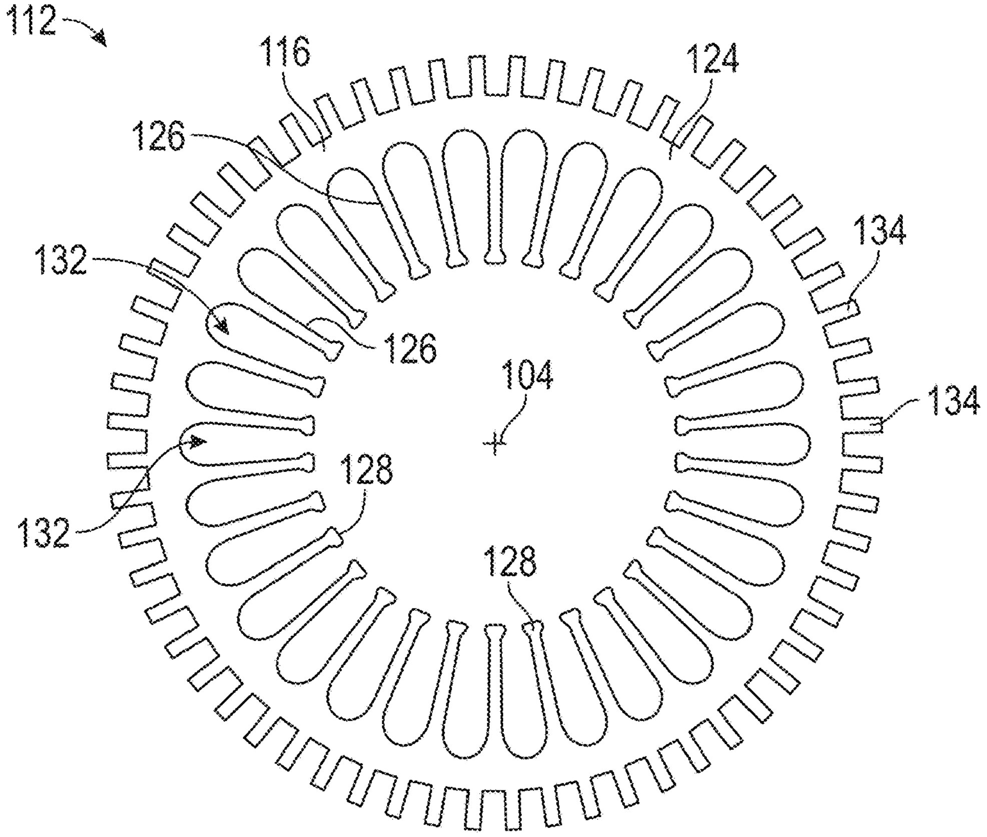
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial airgap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial airgap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
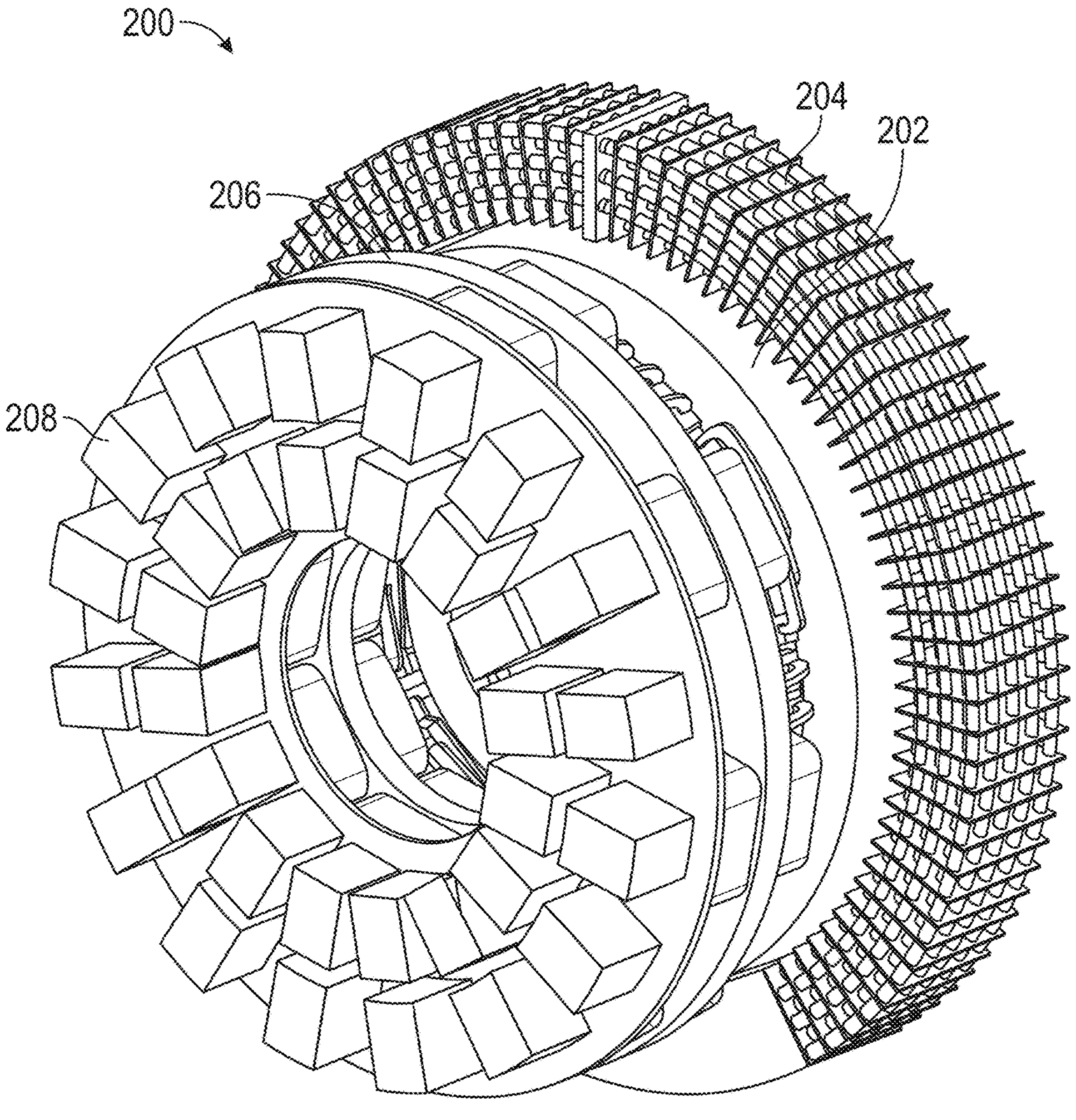
FIG. 2A is a schematic illustration of an aircraft electric motor in accordance with an embodiment of the present disclosure.
Figure 2B:
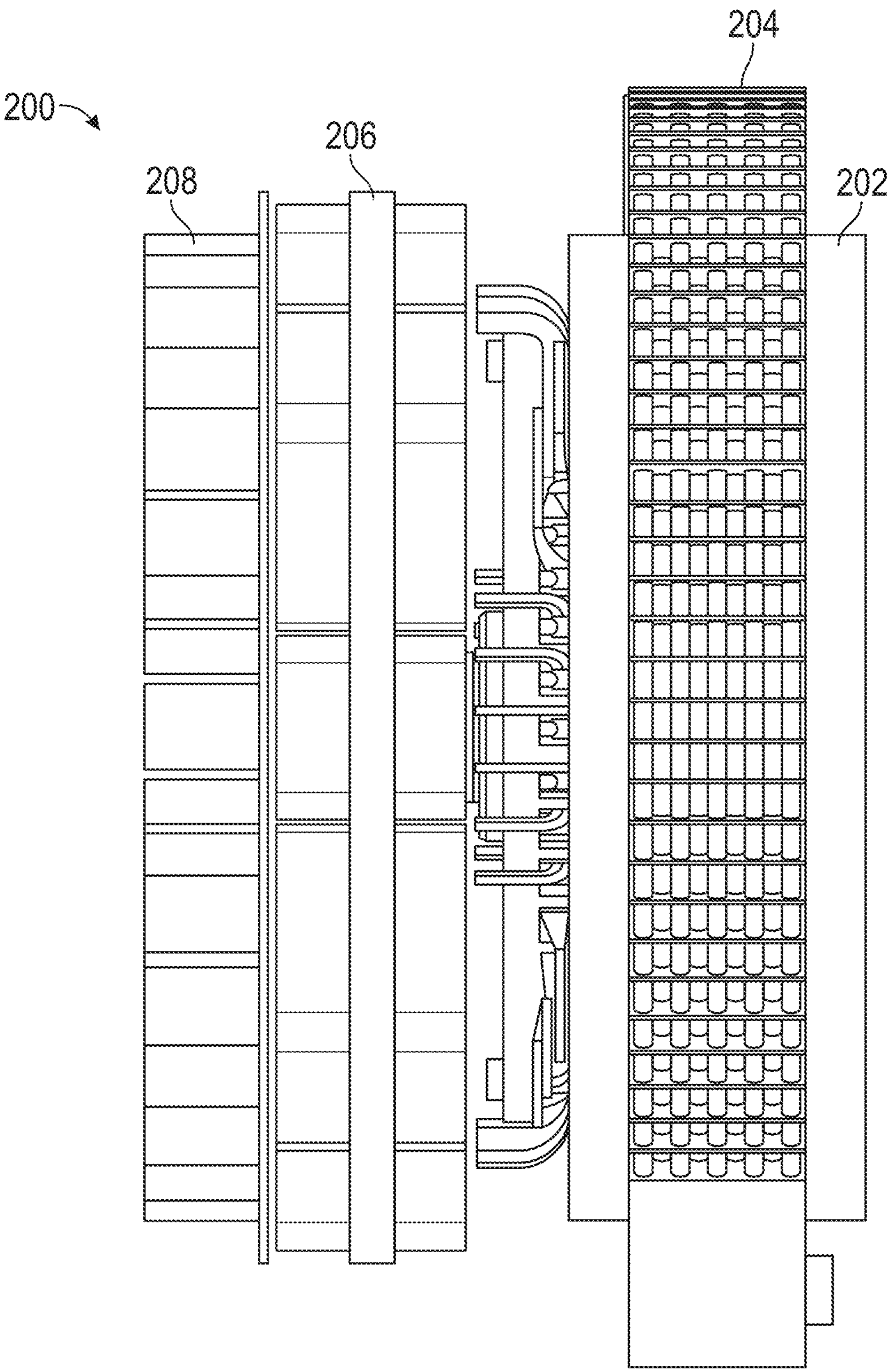
FIG. 2B is a side elevation view of the aircraft electric motor of FIG. 2A.
Figure 2C:
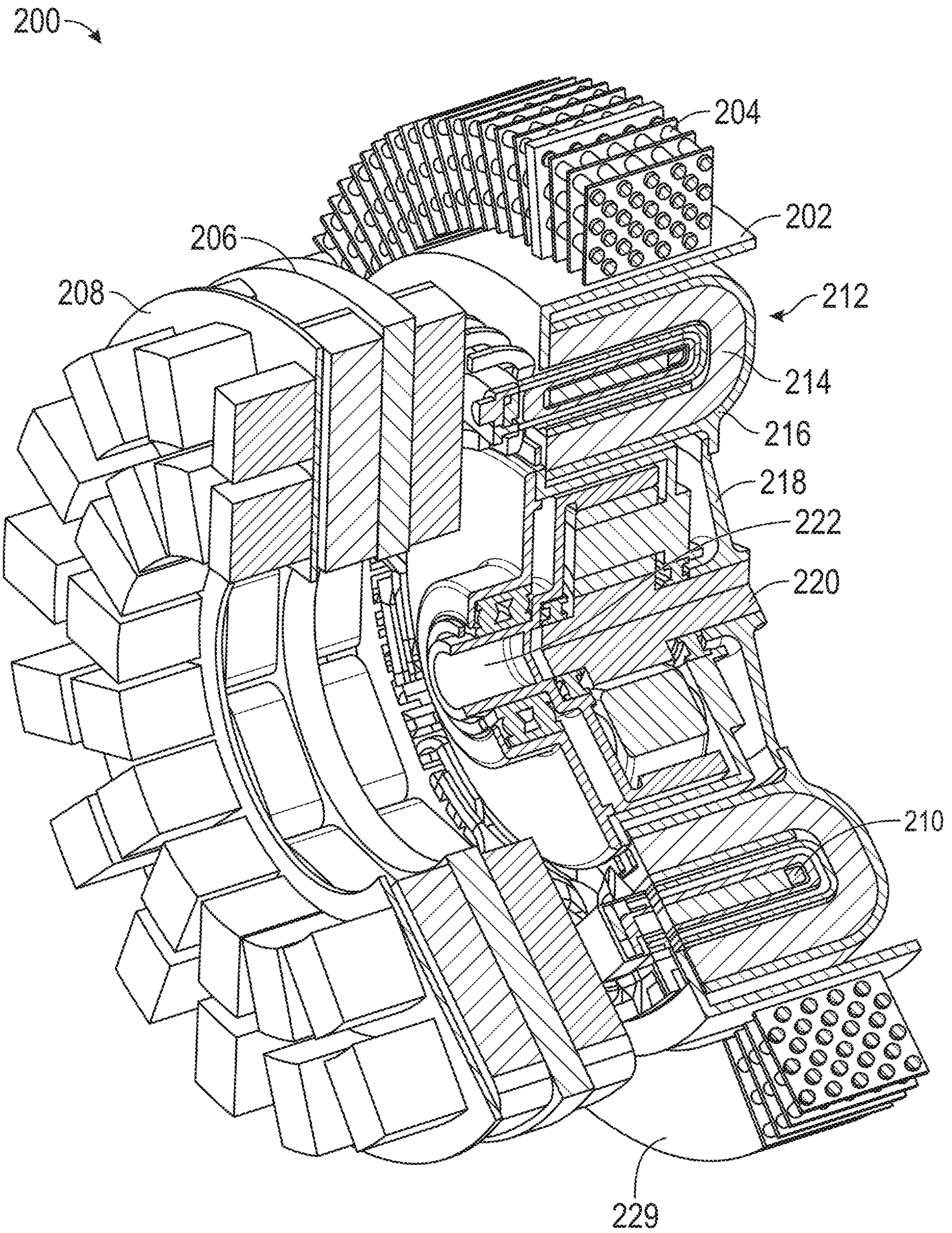
FIG. 2C is a partial cut-away illustration of the aircraft electric motor of FIG. 2A.
Figure 2D:
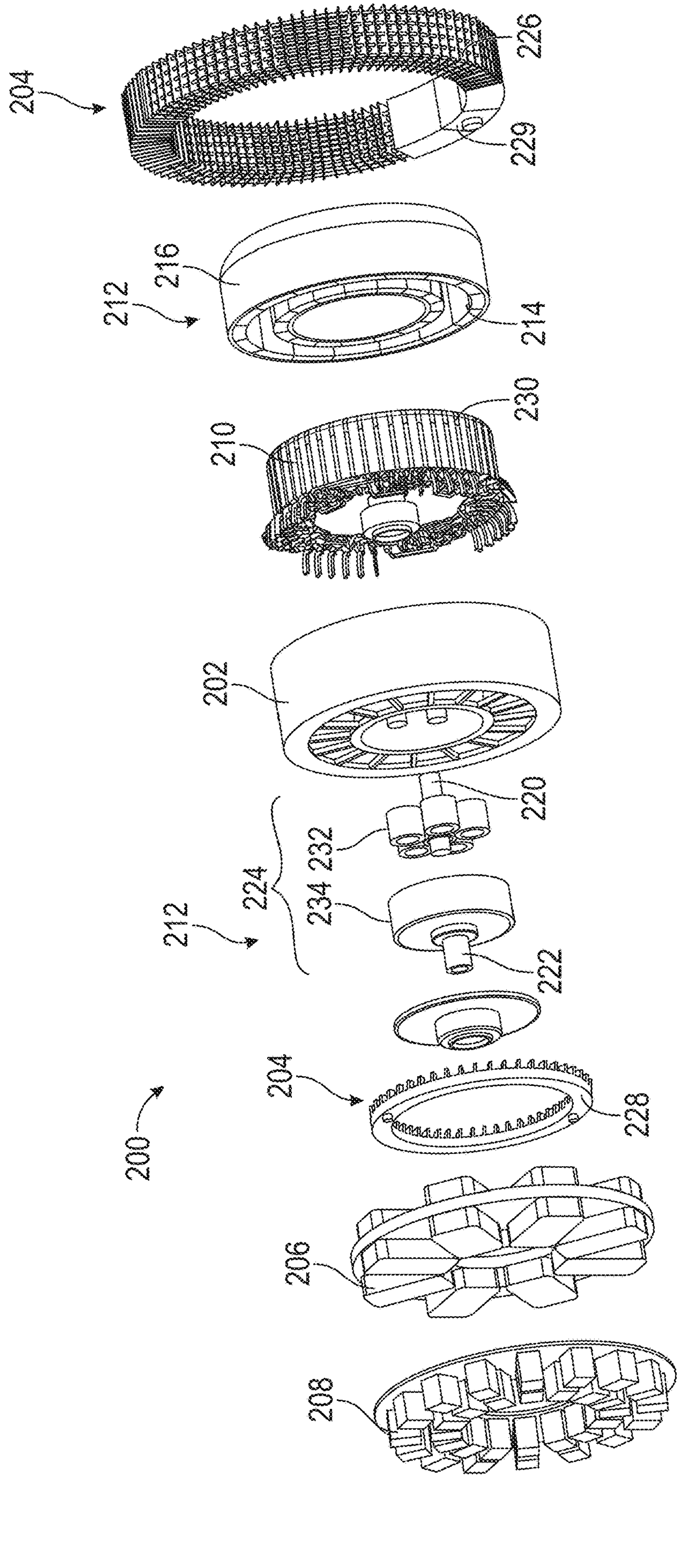
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular or annular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that are configured to control and operate the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
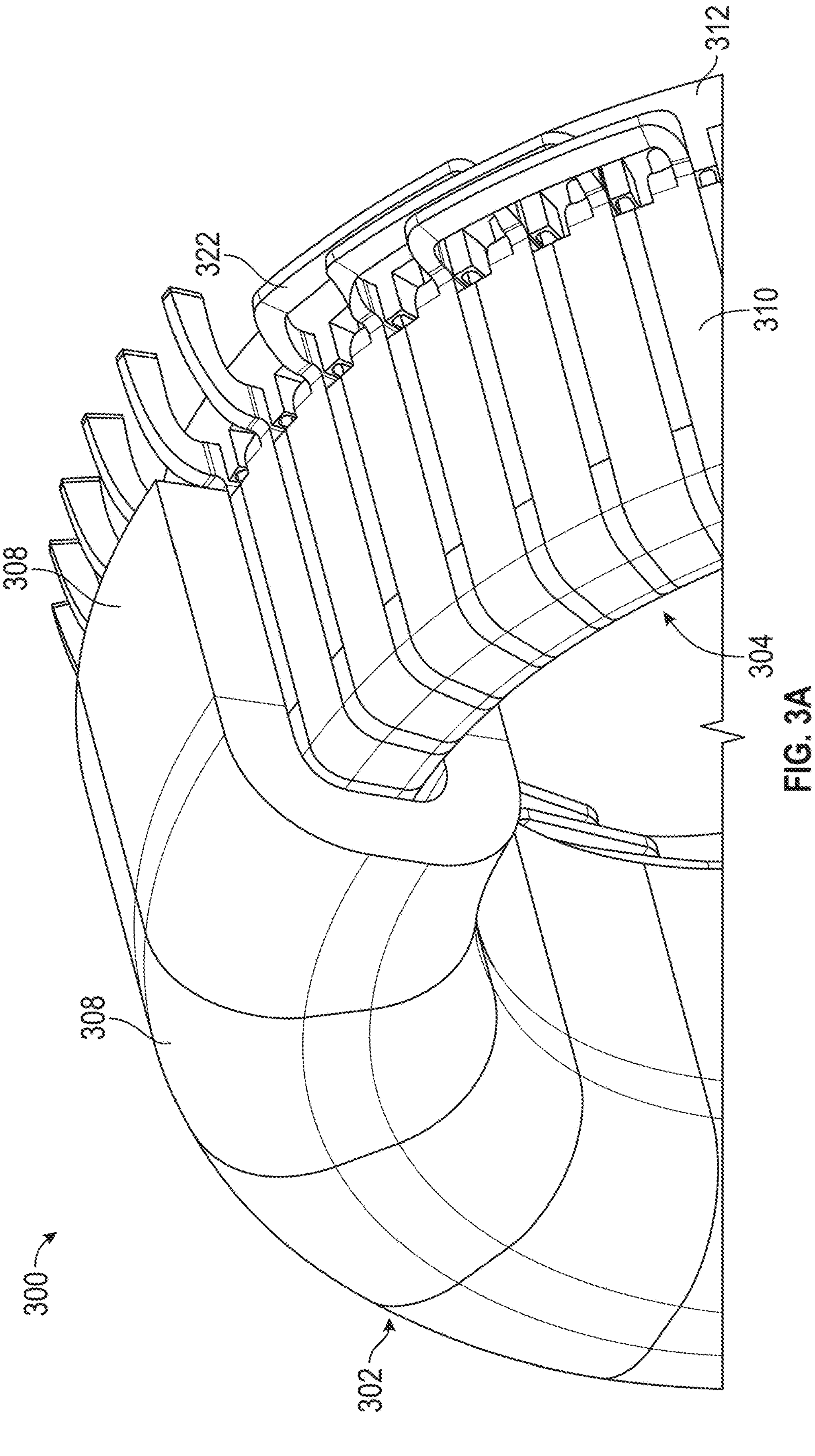
FIG. 3A is a schematic illustration of a rotor and stator of an aircraft electric motor in accordance with an embodiment of the present disclosure.
Figure 3B:
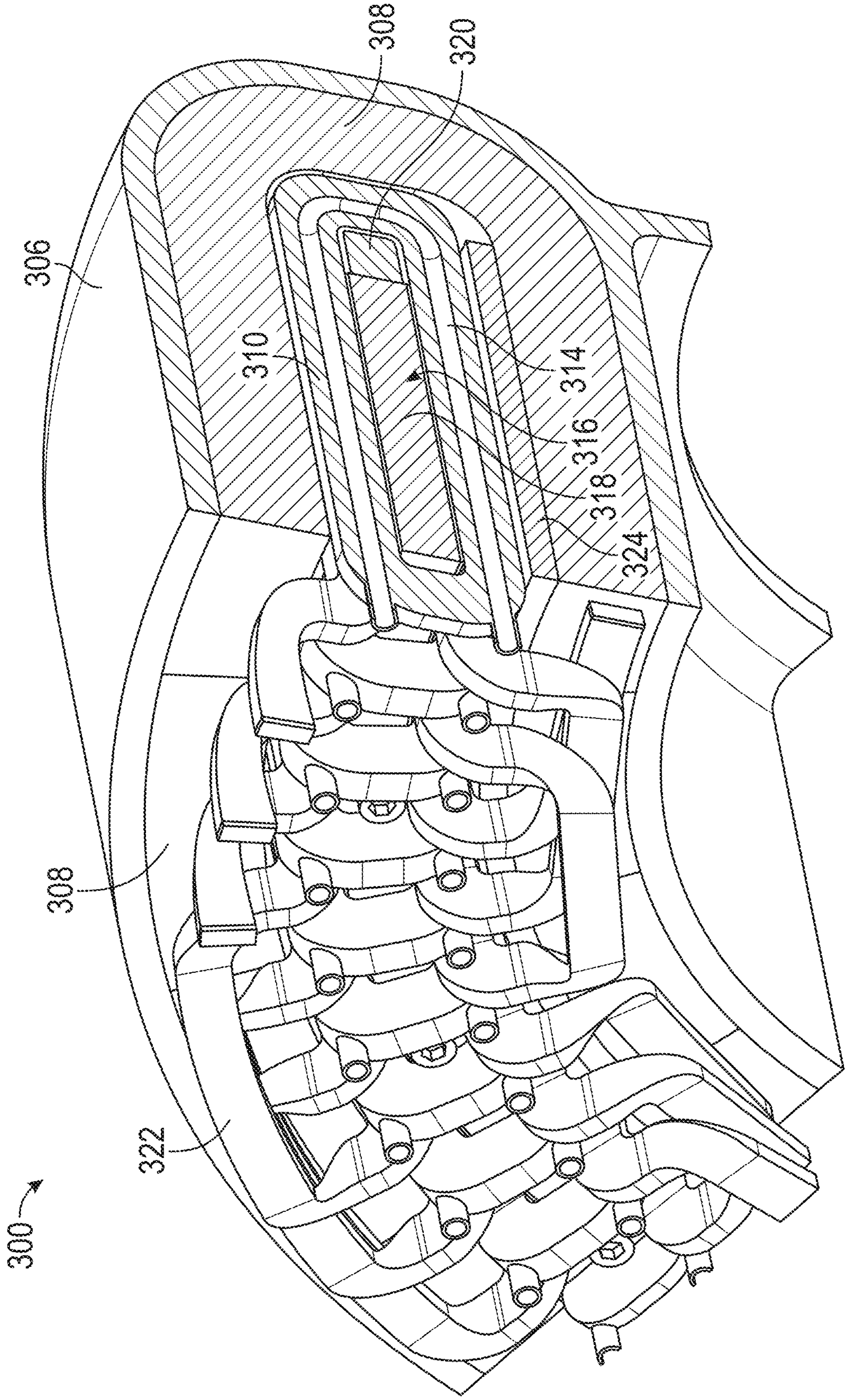
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B.

The windings 310 may be wrapped about a support structure 316 (e.g., back iron or yoke). The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 310 include end connections 322 and may be electrically connected to one or more power module systems of the aircraft electric motor, such as shown above.

As shown in FIG. 3B, the magnets 308 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact allows for free rotation of the rotor 302 relative to the stator 304 during operation.

In aviation-class electric motors, such as shown and described above, a high-power density can be achieved by maximizing torque at a given speed. The torque density can be increased by improving utilization of magnetic materials and increase magnetic loading. Prior concepts for maximizing power density was achieved through minimizing the core of the rotor system. However, such minimization has an impact on magnetic loading (average airgap flux density). Conventionally, introducing a magnetic tooth can increase magnetic loading but may also increase torque ripple. Torque ripple is an effect seen in electric motor designs and refers to a periodic increase or decrease in output torque as the motor shaft rotates. Accordingly, it is desirable to both maximize magnetic loading while minimizing torque ripple. In view of this, embodiments of the present disclosure are directed to incorporating non-magnetic teeth and/or non-magnetic back iron, yoke, or support structure within the motor assembly. The non-magnetic structures (teeth and/or support structure) are made from non-magnetic materials (e.g., potting material, ceramic, etc.) may be infused or embedded with magnetic wires In accordance with embodiments of the present disclosure, the introduction of magnetic wire-infused teeth and/or support structures results in reduced weight and improved power density. Further, advantageously, such configurations can provide a low weight solution without sacrificing average torque of the motor. Shaping of the wires near an airgap (e.g., to the magnets of the motor) can also help manipulate the harmonics in the airgap and result in redistribution of torque ripple harmonics and reduce torque ripple without impacting average torque.

Figure 4A:
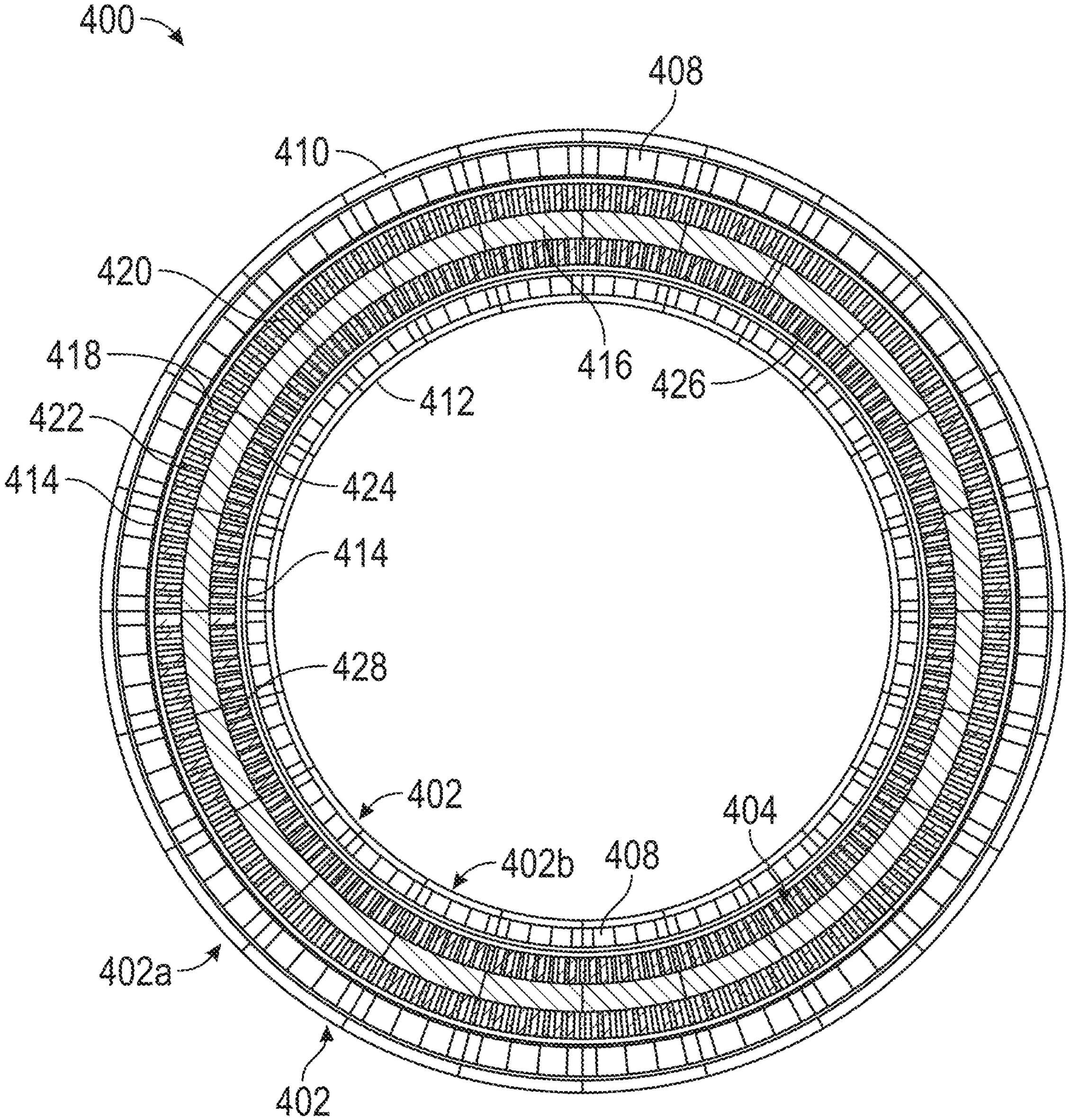
FIG. 4A is a schematic illustration of a radial cross-section of an aircraft electric motor in accordance with an embodiment of the present disclosure.
Figure 4B:
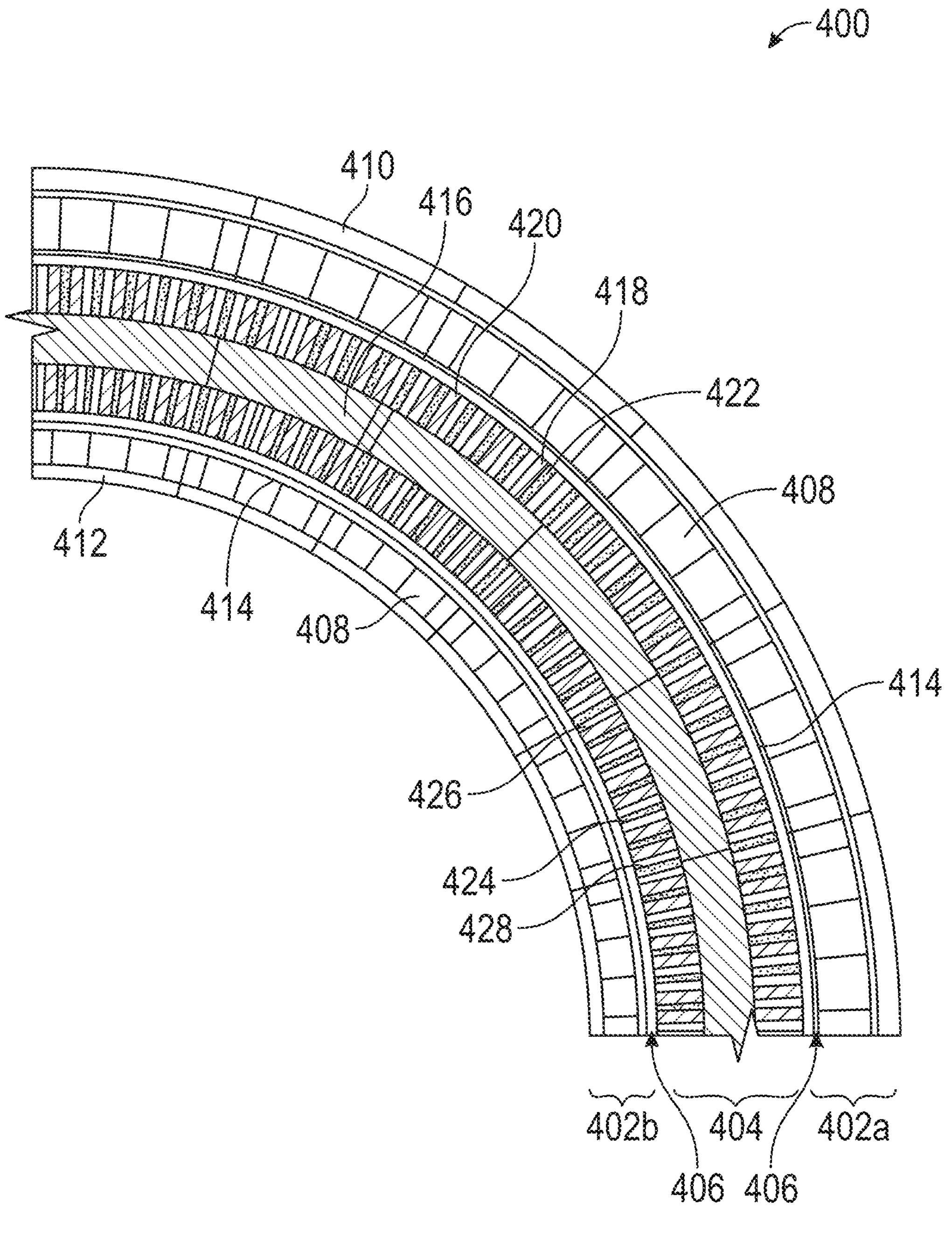
FIG. 4B is an enlarged illustration of a portion of the structure shown in FIG. 4A.

Referring to FIGS. 4A-4B, schematic illustrations of a portion of an aircraft electric motor 400 in accordance with an embodiment of the present disclosure is shown. FIGS. 4A-4B illustrate a portion of a rotor 402 and a stator 404 of the aircraft electric motor 400. FIG. 4A illustrates the full circular structure of the rotor 402 and the stator 404 and FIG. 4B illustrates an enlarged illustration of a portion of the rotor 402 and the stator 404. The rotor 402 and the stator 404 may be part of an aircraft electric motor similar to that shown and described herein and used as described herein.

As shown, the rotor 402 is arranged about the stator 404, with an outer portion 402*a* and an inner portion 402*b* arranged radially outward and inward from the stator 404, respectively. The outer and inner portions 402*a*, 402*b* may be parts of a substantially U-shaped magnet assembly, as shown and described above. The stator 404 is arranged between the outer and inner portions 402*a*, 402*b* with an airgap 406 therebetween, as shown in FIG. 4B. The rotor 404 includes a plurality of magnets 408, which may be substantially U-shaped and span from the outer portion 402*a* to the inner portion 402*b*. An outer rotor sleeve 410 and an inner rotor sleeve 412 may be separate components or a continuous structure, as shown and described above, and are configured to support and retain the magnets 408 of the rotor 402. Further, one or more retention sleeves 414 may be arranged on a side of the magnets 408 that faces the stator 404. The rotor 402 is configured to be rotationally driven by current that is passed through the stator 404.

In some configurations, the stator 404 may include a support structure 416 (e.g., a back iron or yoke). The support structure 416 may be configured to support, on a radial outer side thereof, a plurality of outer teeth 418, outer coils 420, and outer cooling channels 422. Similarly, on a radially inner side of the support structure 416 are arranged a plurality of inner teeth 424, inner coils 426, and inner cooling channels 428. It will be appreciated that, in accordance with some embodiments, the support structure 416 may be omitted and the structural aspects thereof provided by other features, as shown and described herein.

In some embodiments of the present disclosure, one or more of the outer teeth 418, the inner teeth 424, and/or the support structure 416 may be made of a non-magnetic material with embedded magnetic wires. In some example embodiments, each of the outer teeth 418 the inner teeth 424, and/or the support structure 416 may be formed of a non-magnetic material with embedded magnetic wires and shaped to reduce torque ripple while increasing magnetic loading and improving manufacturability and address stack-up tolerance challenges.

As shown in FIG. 4A, the rotor 402 and stator 404 form a substantially ring-shape or annular shape. As shown, the outer teeth 418 and the inner teeth 424 are each arranged in a circumferential arrangement and extend radially from the support structure 416. The outer teeth 418 extend radially outward from the support structure 416 and the inner teeth 424 extend radially inward from the support structure 416.

In some configurations, the teeth 418, 424 may be the same in shape, orientation, material, and the like about the circumferences of the stator 404. In other embodiments, the teeth 418, 424 may be arranged in sets or specific configurations arranged in a repeating pattern about the respective circumferential arrangement.

In aviation-class electric machines, high power density electric power trains can be achieved by fully integrating electrical, thermal, and mechanical functionality to take advantage of various phenomenon. While maximizing power density may be desirable, such increases in power density may inherently increase losses and reduce efficiency. Therefore, it is critical to extract heat loads in an efficient manner with minimal impact on the overall performance.

To increase power density, the introduction of various elements such as use of magnetic teeth and an inner sleeve for the outer rotor have been implemented. However, such increased power density features may result in space harmonics in the airgap that can impact rotor operation and/or introduce Eddy current losses in the sleeve of the rotor. These losses may result in an increase in rotor temperature. The increased rotor temperature may impact permanent magnets that are housed in the rotor. In view of this and other considerations, embodiments of the present disclosure are directed to integration of a fan into the rotor structure.

For example, in some embodiments a fan, fan structure, or fan assembly (hereinafter referred to as a fan assembly) may be arranged between portions of the rotor (e.g., outer rotor portion and end rotor portion). In other embodiments, such a fan assembly may be arranged between the end rotor portion and an inner rotor portion. In other embodiments, multiple fan assemblies may be arranged at different locations on the rotor. Improved airflow provided by the fan assemblies may enhance extraction of heat loads generated due to electromagnetic losses from the rotor and stator sub-components. In some embodiments, the fan assemblies may be configured to provide structural support and loads transfers between elements of the rotor.

Figure 5A:
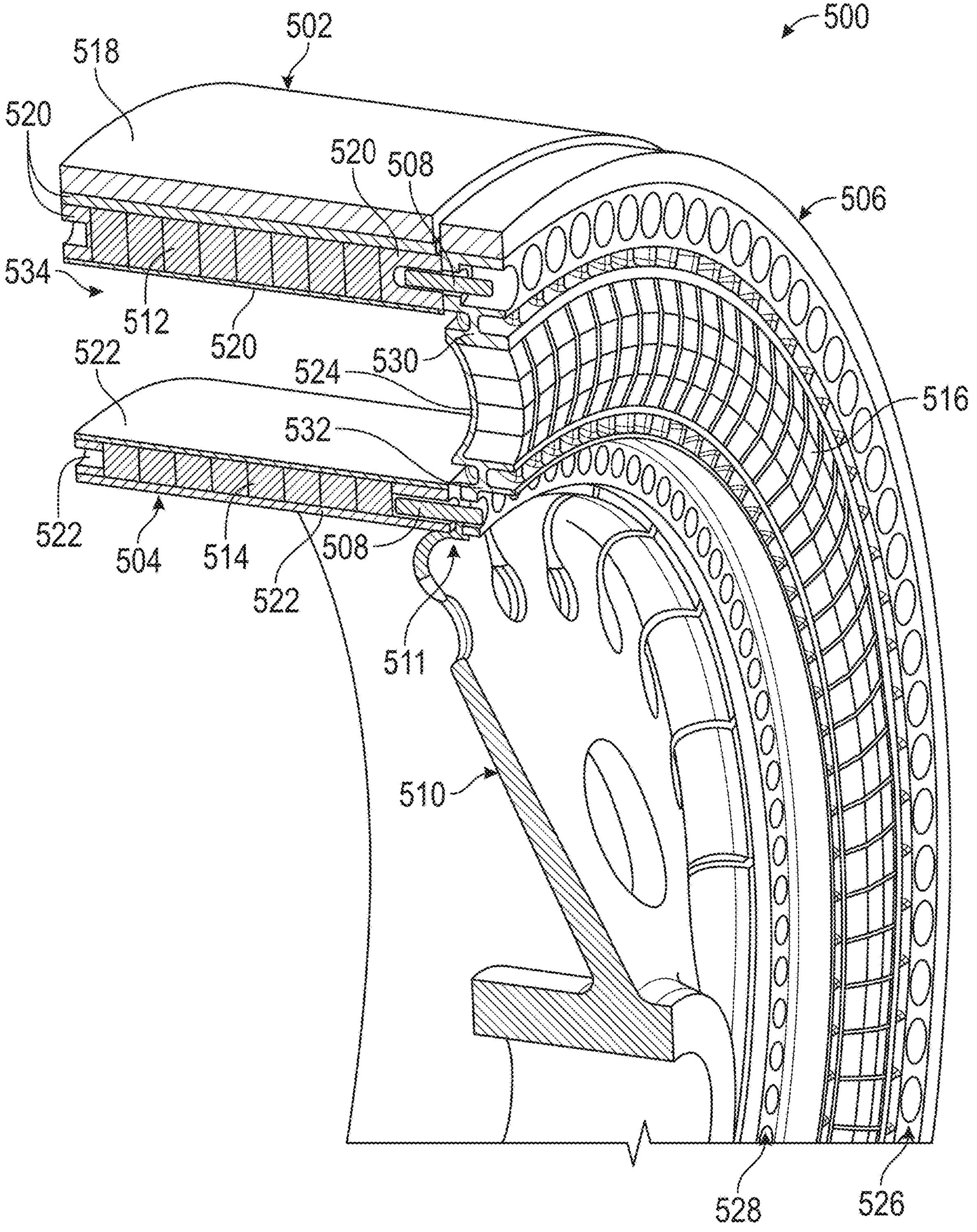
FIG. 5A is a schematic illustration of a rotor assembly in accordance with an embodiment of the present disclosure.
Figure 5B:
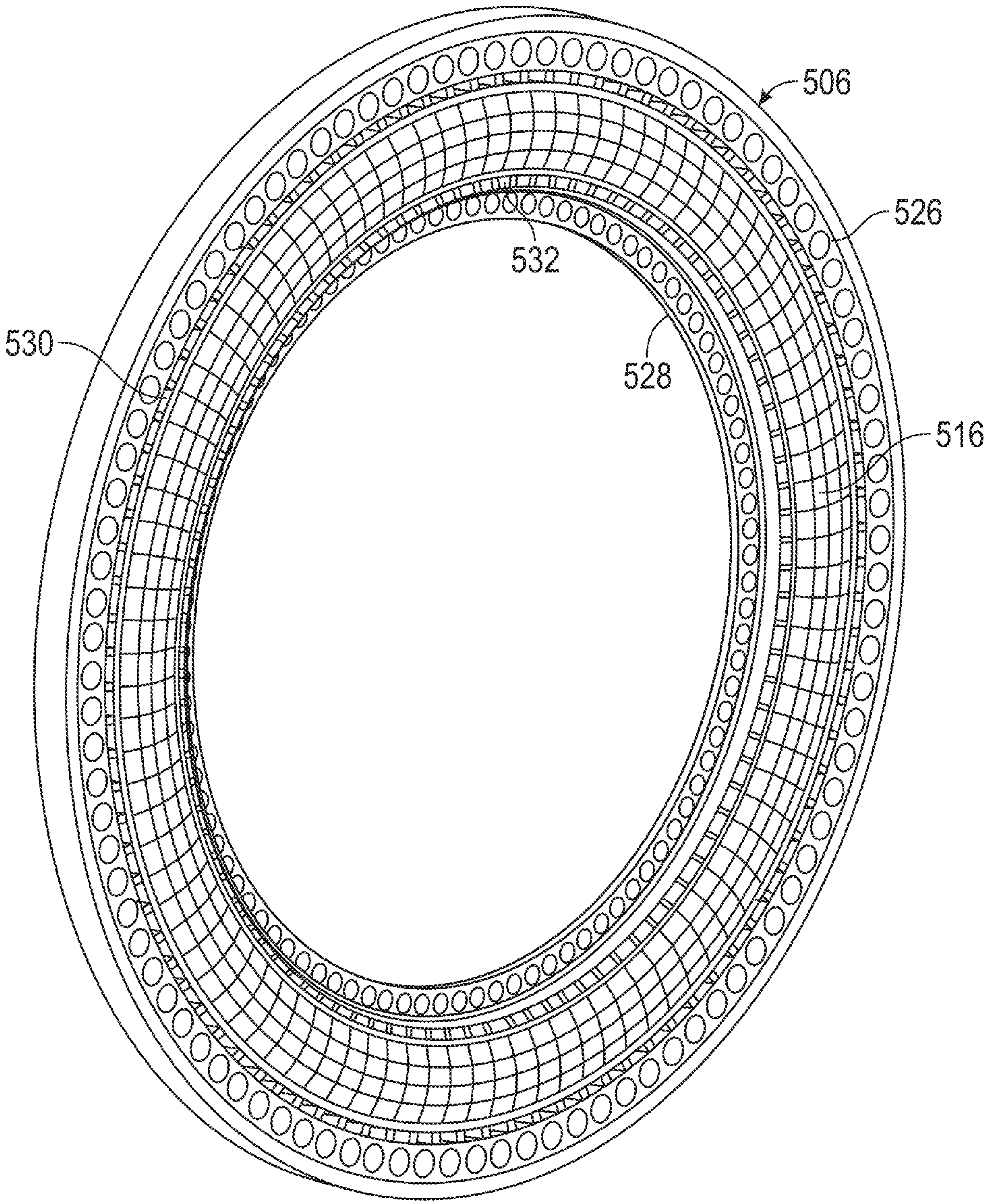
FIG. 5B is a schematic illustration of a portion of the rotor assembly of FIG. 5A.
Figure 5C:
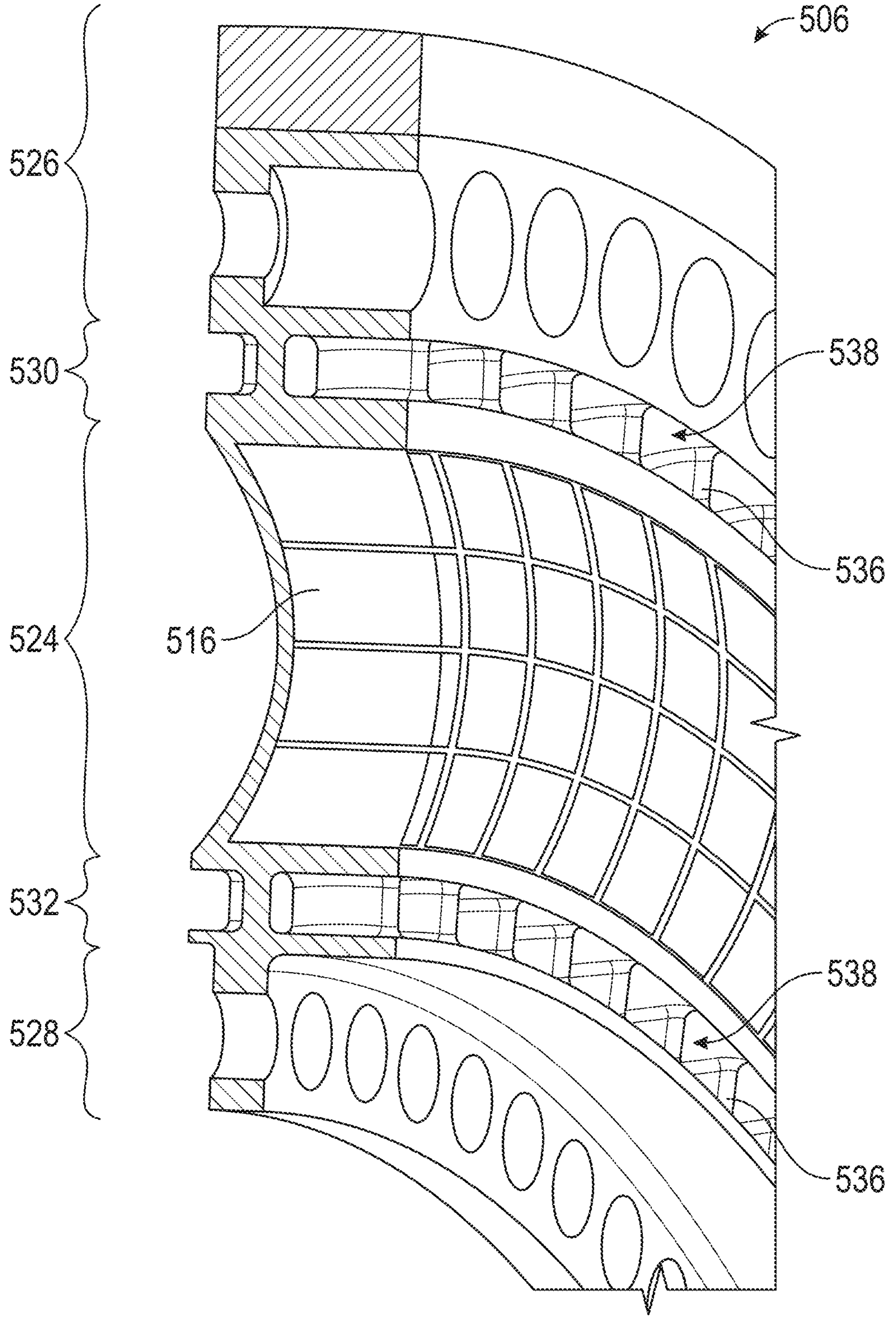
FIG. 5C is an enlarged sectional illustration of the portion of the rotor assembly shown in FIG. 5B.

Referring now to FIGS. 5A-5C, schematic illustrations of a rotor 500 for an electric machine in accordance with an embodiment of the present disclosure are shown. The rotor 500 may be configured to be used with an electric machine or electric motor, such as the systems shown and described above. In the above illustrated embodiments, the rotors are substantially unitary in form with U-shaped magnets installed therein. In contrast, the rotor 500 has a multi-part construction, although the magnet assembly substantially correspondence to a U-shaped magnet assembly, and thus the functionality of the rotor 500 may be substantially similar to that shown and described above.

The rotor 500 includes an outer diameter portion 502, an inner diameter portion 504, and an end portion 506. As shown the outer diameter portion 502 and the inner diameter portion 504 are oriented in an axial direction and the end portion 506 is oriented in a radial direction. The each of the outer diameter portion 502 and the inner diameter portion 504 may be fixedly coupled to the end portion 506 by sets of fasteners 508. A rotor hub 510 may extend radially inward from the inner diameter portion 504, and may be coupled between the inner diameter portion 504 and the end portion 506 and fastened thereto by the fasteners 508 at a hub junction 511. The outer diameter portion 502 includes outer diameter magnets 512, the inner diameter portion includes inner diameter magnets 514, and the end portion 506 includes end portion magnets 516. The arrangement of the magnets 512, 514, 516 may substantially match a U-shaped magnet configuration, such as shown and described above.

In some configurations, the end portion magnets 516 may be omitted, and the rotor 500 may only include the outer diameter magnets 512 in the outer diameter portion 502 and the inner diameter magnets 514 of the inner diameter portion.

The outer diameter portion 502 of the rotor 500 includes a rotor wrap 518 that radially constrains the outer diameter portion 502 during operation. The outer diameter magnets 512 are arranged radially inward from the rotor wrap 518 and are secured within an outer diameter support structure 520 that may retain the outer diameter magnets 512 in a radial direction (both radially inward and radially outward), with the outer diameter support structure 520 having axial portions on axial ends of the set of outer diameter magnets 512. The fasteners 508 may engage with an axial portion of the outer diameter support structure 520 to secure the outer diameter portion 502 to the end portion 506 of the rotor 500. The outer diameter support structure 520 may provide a full wrap structure about the outer diameter magnets 512, with the rotor wrap 518 providing additional support to prevent radial movement of the outer diameter portion 502 during operation.

The inner diameter portion 504 of the rotor 500 houses the inner diameter magnets 514 within an inner diameter support structure 522. The inner diameter support structure 522 is configured to retain the inner diameter magnets 512 in a radial direction (both radially inward and radially outward) and in the axial direction. The fasteners 508 may engage with an axial portion of the inner diameter support structure 522 to secure the inner diameter portion 504 to the end portion 506 of the rotor 500.

The end portion 506 of the rotor 500 includes an end portion support structure 524 that houses the end portion magnets 516. The extending radially outward from the end portion support structure 524 is an outer diameter extension 526 and extending radially inward from the end portion support structure 524 is an inner diameter extension 528. Each of the outer diameter extension 526 and the inner diameter extension 528 include apertures for receiving the fasteners 508 for engagement with the outer diameter portion 502 and the inner diameter portion 504. In this illustrative configuration, the end portion 506 includes an outer diameter fan assembly 530 arranged between the end portion support structure 524 and the outer diameter extension 526 and an inner diameter fan assembly 532 arranged between the end portion support structure 524 and the inner diameter extension 528.

When assembled together, the outer diameter portion 502, the inner diameter portion 504, and the end portion 506 of the rotor 500 define a stator cavity 534 for receiving a stator structure, such as the windings, cooling elements, and the like, such as shown and described above (e.g., stator 304 shown in FIGS. 3A-3B). FIG. 5B illustrates the end portion 506 of the rotor 500 in isolation. FIG. 5C illustrates an enlarged, sectional view of the end portion 506. As shown in FIG. 5C, each of the outer diameter fan assembly 530 and the inner diameter fan assembly 532 include a plurality of fan blades 536. The fan blades 536 of the fan assemblies 530, 532 are arranged with flow paths 538 defined between adjacent fan blades 536 to permit airflow to pass through the end portion 506.

By including the flow paths 538 in the end portion 506 of the rotor 500, airflow may be able to pass through the stator cavity 534 and provide cooling to the components of the stator and to the magnets 512, 514, 516 of the rotor 506. That is, a cooling flow may be directed into the stator cavity 534 at a forward end (e.g., end in which the stator is installed into the stator cavity 534) and the cooling flow may exit through the flow paths 538. This additional cooling may provide additional operational benefits to the electric machine in which the rotor 500 is incorporated. For example, the throughflow through the fan assemblies 530, 532 may ensure a level pressure drop to reduce uneven flow through and around the stator arranged within the stator cavity 534. Further, the throughflow may extract heat from both surfaces of the rotor 500 and the stator components arranged within the stator cavity 534 and may minimize hot spots on both structures. Further, the throughflow through the fan assemblies 530, 532 may result in reduced magnet operating temperatures and can enable an increased power density of the electric machine.

It will be appreciated that the direction of rotation and/or the angle/orientation of the fan blades of the fan assemblies 530, 532 may control a flow direction of cooling air into and through the stator cavity 534. For example, in some configurations, the direction of flow of the cooling air, that is induced by the fan assemblies 530, 532, may be in a direction from the open end of the stator cavity 534 toward the end portion 506. If the direction of rotation (with the same oriented fan blades) is changed to be opposite of such a configuration, or the fan blades are reversed in orientation, the flow direction may be from the end portion 506 toward the open end of the stator cavity 534. As such, the direction of flow induced by the fan assemblies of the present disclosure is not intended to be limited to only one directional configuration.

Referring still to FIGS. 5A-5C, in accordance with a non-limiting example, the rotor wrap 518 may be formed from carbon fiber or other non-magnetic material. In some embodiments, the magnets 512, 514, 516 may be Neodymium magnets or Samarium-cobalt magnets. In a non-limiting configuration, the outer diameter magnets and the end portion magnets may be Neodymium magnets and the inner diameter magnets may be Samarium-cobalt magnets. In some embodiments, the structure of the outer diameter portion 502 that supports the outer diameter magnets 512 may be formed from a non-magnetic metal, such as aluminum. In some embodiments, the structure of the inner diameter portion 504 that supports the inner diameter magnets 514 may be formed from titanium alloys, Inconel alloys, or the like. In some embodiments, the structure of the end portion 506 that supports the end portion magnets 516 may be formed from titanium alloys, Inconel alloys, or the like. In some embodiments, the end portion 506 may include a similar warp (e.g., similar to rotor wrap 518) to provide radial constraint upon the end portion 506. Although certain example materials are described for forming various features and structures of the electric machine components of the present disclosure, such materials are not intended to be limiting but rather are provided as examples of material that may be employed in manufacturing the described components.

Figure 6:
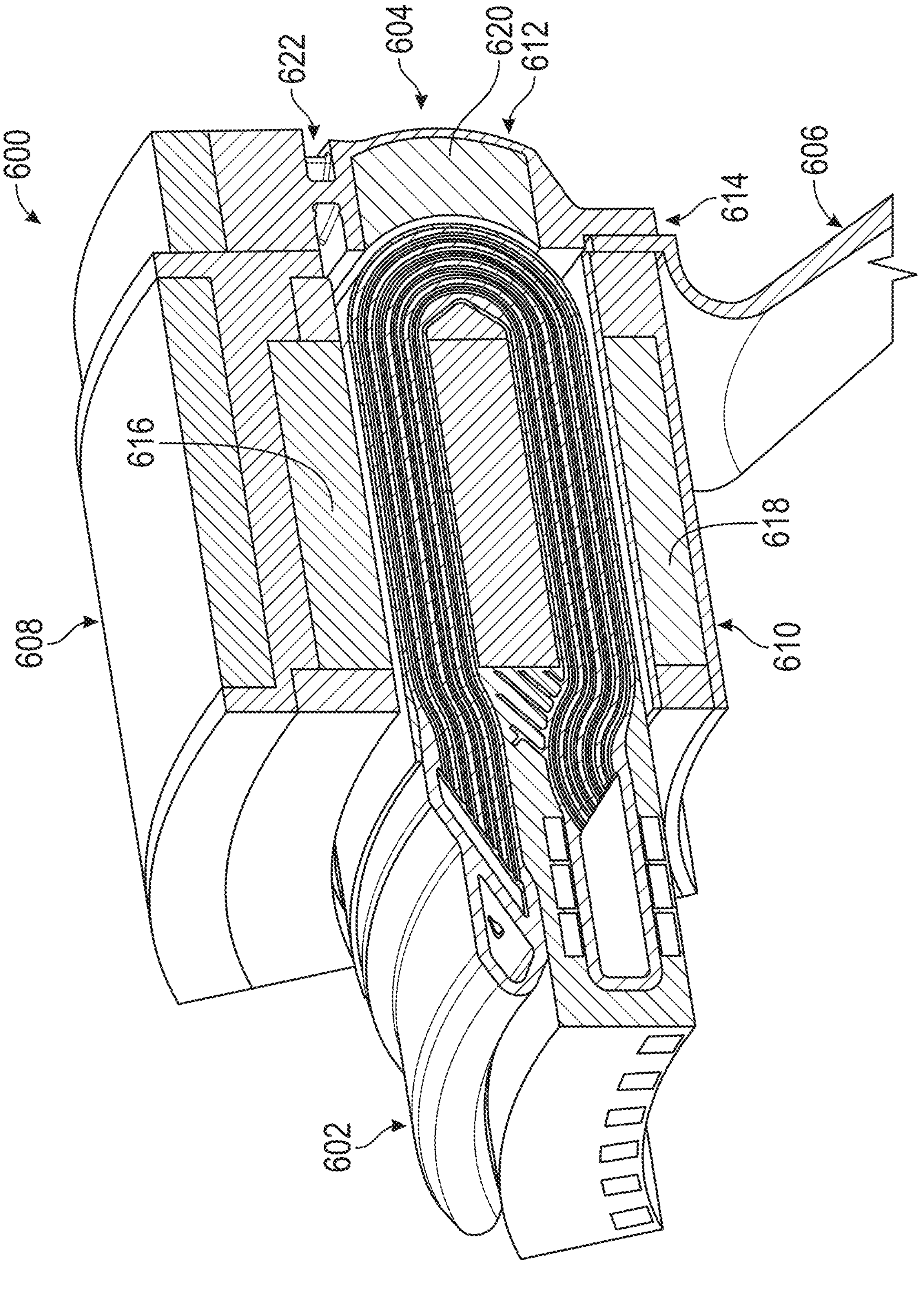
FIG. 6 is a schematic illustration of a portion of an electric machine in accordance with an embodiment of the present disclosure.

Referring now to FIG. 6, a schematic illustration of a portion of an electric machine 600 in accordance with an embodiment of the present disclosure is shown. The electric machine 600 includes a stator assembly 602 and a rotor assembly 604. The stator assembly 602 may be configured similar to that shown an described above, having windings, cooling channels, and the like. A portion of the stator assembly 602 is arranged to fit within a stator cavity of the rotor assembly 604 (e.g., stator cavity 534 shown in FIG. 5A).

The rotor assembly 604 includes a rotor hub 606 that may connect to a shaft or the like that may be rotationally driven by the rotor assembly 604. The rotor assembly 604, similar to that shown in FIGS. 5A-5C, includes an outer diameter portion 608, an inner diameter portion 610, and an end portion 612. The rotor hub 606, the inner diameter portion 610, and the end portion 612 may be joined together at a hub junction 614. One or more fasteners may be used to join the rotor hub 606, the inner diameter portion 610, and the end portion 612 together. In other configurations, adhesives, welding, bonding, or mechanical connections (e.g., tongue-and-groove, latches, etc.) may be used to join the components together. Further still, in some embodiments, two or more of the rotor hub 606, the inner diameter portion 610, and the end portion 612 may be integrally formed (e.g., cast, molded, etc.) as a unitary structure. At the outer diameter of the rotor assembly 604, the outer diameter portion 608 is coupled to the end portion 612 in a similar fashion (e.g., fasteners, mechanical connections, unitary formation, etc.).

The outer diameter portion 608 includes outer diameter magnets 616. The inner diameter portion 610 includes inner diameter magnets 618. The end portion 612 includes end portion magnets 620. Similar to the configuration of FIGS. 5A-5C, the magnets 616, 618, 620 are arranged to form a substantially U-shaped configuration, with the stator assembly 602 arranged within the open portion of the U-shaped structure. In this configuration, the rotor assembly 604 includes one fan assembly 622. The fan assembly 622 is arranged at the outer diameter end of the end portion 612. That is, in contrast to the configuration of FIGS. 5A-5C which includes inner and outer diameter fan assemblies, the rotor assembly 604 of FIG. 6 includes only the single fan assembly 622 which is arranged at the outer diameter of the end portion 612 of the rotor assembly 604.

Figure 7A:
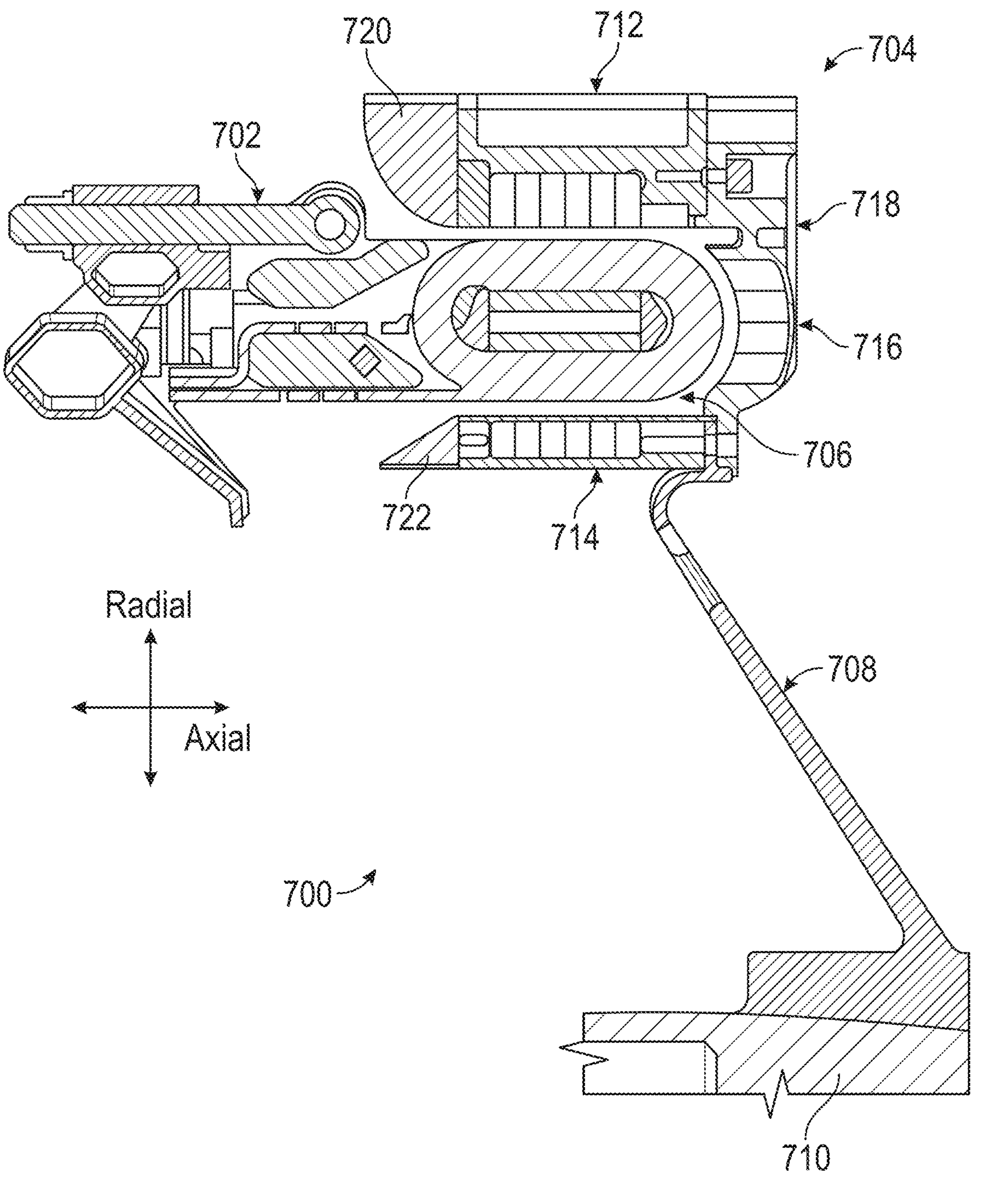
FIG. 7A is a schematic illustration of a portion of an electric machine in accordance with an embodiment of the present disclosure.
Figure 7B:
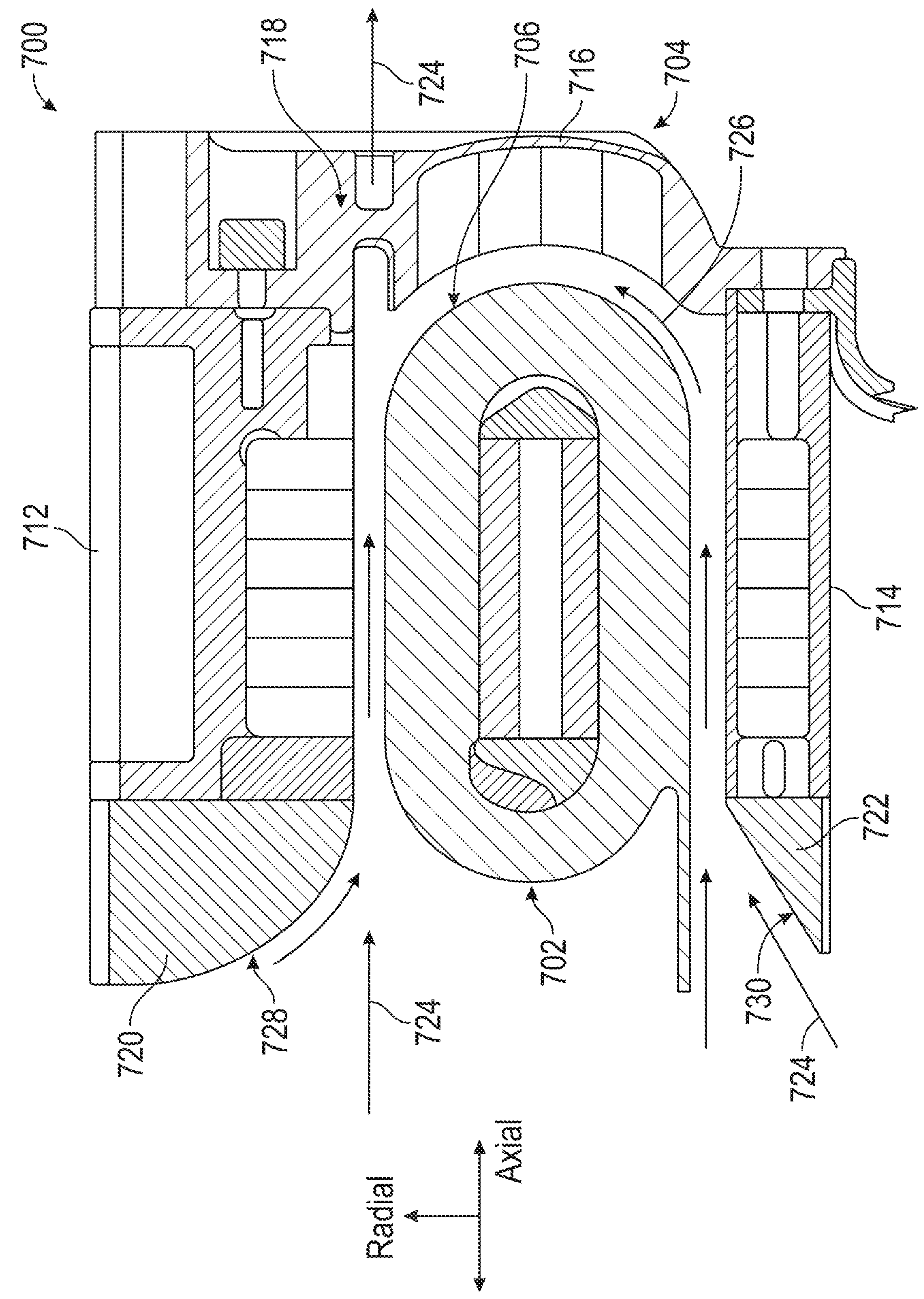
FIG. 7B is a schematic illustration of cooling flow passing through the portion of the electric machine shown in FIG. 7A.

Referring now to FIGS. 7A-7B, schematic illustrations of a portion of an electric machine 700 in accordance with an embodiment of the present disclosure are shown. FIG. 7A illustrates a side, sectional view of the portion the electric machine 700 and FIG. 7B is an enlarged illustration showing cooling flow through the portion of the electric machine 700. The electric machine 700 includes a stator assembly 702 and a rotor assembly 704. The stator assembly 702 may be configured similar to that shown an described above, having windings, cooling channels, and the like. A portion of the stator assembly 702 is arranged to fit within a stator cavity 706 of the rotor assembly 704.

The rotor assembly 704 includes a rotor hub 708 that connected to a shaft 710 that may be rotationally driven by the rotor assembly 704. The rotor assembly 704 includes an outer diameter portion 712 and an inner diameter portion 714. An end portion 716 connects the rotor hub 708, the inner diameter portion 714, and the outer diameter 712 together, as shown and described above. Each of the outer diameter portion 712, the inner diameter portion 714, and the end portion 716 include respective magnets, as shown and described above. The outer diameter portion 712, the inner diameter portion 714, and the end portion 716 and the magnets thereof are arranged to form a substantially U-shaped configuration, with the stator assembly 702 arranged within the open portion of the U-shaped structure which defines stator cavity 706. In this configuration, the rotor assembly 704 includes a fan assembly 718 defined in the end portion 716 and arranged toward the outer diameter end of the end portion 716.

In this configuration, the rotor assembly 704 includes one or more optional flow control features to aid in directing cooling flow into and through the stator cavity 706. For example, in this illustrative configuration, the outer diameter portion 712 includes a first flow control feature 720 and the inner diameter portion 714 includes a second flow control feature 722. The first flow control feature 720 extends axially outward from an end of the outer diameter portion 712 opposite the end portion 716. The second flow control feature 722 extends axially outward from an end of the inner diameter portion 714 opposite the end portion 716. The flow control features 720, 722 may be configured to draw in and direct flow into the stator cavity 706 to increase a flow of cooling air along surfaces of the stator assembly 702 and surfaces of the rotor assembly 704. The cooling air directed into the stator cavity 706 may be drawn through the stator cavity 706 by the fan assembly 718. For example, during operation, the fan assembly 718 will be rotated with the rotor assembly 704 and the fan blades will thus be rotated to cause a pressure differential and draw the cooling flow through the stator cavity 706.

Referring to FIG. 7B, an enlarged illustration of a cooling flow 724 through the electric machine 700 is shown. The cooling flow 724 will enter the stator cavity 706 at an axial forward end, flow through the stator cavity 706 around and along surfaces of the stator assembly 702 and the rotor assembly 704. The cooling flow 724 will then exit through the fan assembly 718 as the cooling flow 724 is pulled through the stator cavity 706 by the rotating fan blades of the fan assembly 718. At the axial forward end of the rotor assembly 704, the first control feature 720 will aid in directing the cooling flow 724 into the stator cavity 706 at an outer diameter portion of the stator cavity 706. Similarly, the second control feature 722 will aid in directing the cooling flow 724 into the stator cavity 706 at an inner diameter portion of the stator cavity 706. The directed cooling flow 724 will then pass into and through the stator cavity 706 and exit through the fan assembly 718. In this configuration, because only one fan assembly 718 is provided, the cooling flow 724 that enters at the inner diameter side of the stator cavity 706 will be turned and flow radially outward (arrow 726) along a surface of the end portion 706 and provide cooling to the end portion magnets and an axially aft end of the stator assembly 702 that is arranged within the stator cavity 706. The axially turned flow will then be pulled axially aftward by the rotating fan assembly 718 and directed out of the stator cavity 706.

In the illustrative configuration of FIGS. 7A-7B, the first flow control feature 720 is configured with a curved or contoured surface 728 and the second flow control feature 722 is configured with a straight or angled surface 730. In both configurations, the surfaces 728, 730 are angled or contoured to funnel and direct the cooling flow 724 into the stator cavity 706. It will be appreciated that any type of surface or geometry may be used for the flow control features 720, 722, and in some embodiments, but flow control features may have curved/contoured or straight/angled surfaces. Further, in some embodiments, only one of the two flow control features 720, 722 may be employed (e.g., only the outer diameter flow control feature 720 or only the inner diameter flow control feature 722). The flow control features 720, 722 may be separate components that are affixed or otherwise attached to the respective portions 712, 714 of the rotor assembly 704. Such attachment may be by fastener, welding, bonding, adhesives, clips, clasps, tongue-and-groove connections, or the like. In other embodiments, the flow control features 720, 722 may be integrally formed as part of the structure of the respective portions 712, 714 of the rotor assembly 704.

As shown in FIGS. 6, 7A-7B, a rotor assembly having a configuration with a single fan assembly (outer diameter location) are illustrated. In FIGS. 5A-5C, a rotor assembly having two fan assemblies (both inner and outer diameter locations) is illustrated. In still further embodiments of the present disclosure, a rotor assembly may be provided with a single fan assembly arranged at an inner diameter end of the end portion (e.g., opposite the configuration of FIGS. 6, 7A-7B).

Figure 8B:
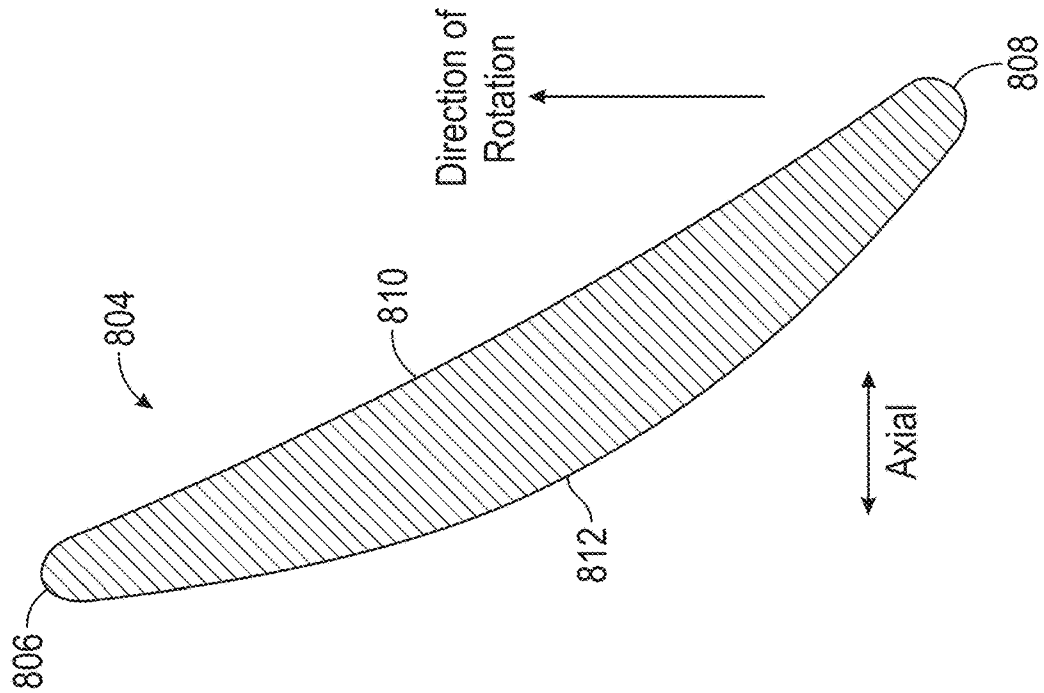
FIG. 8B is a schematic illustration of a fan blade of the fan assembly of FIG. 8A.
Figure 8A:
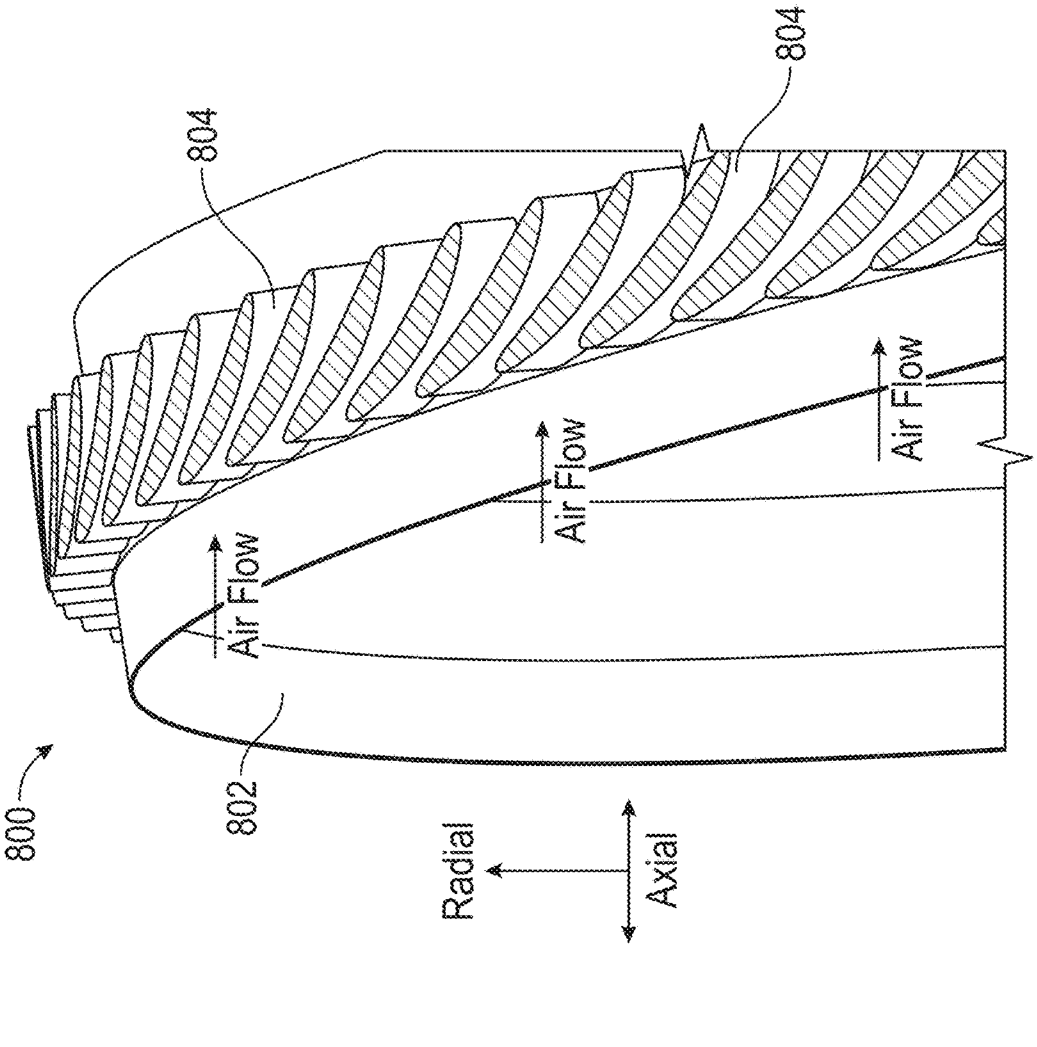
FIG. 8A is a schematic illustration of a portion of a rotor assembly in accordance with an embodiment of the present disclosure having a fan assembly thereon.

Referring now to FIGS. 8A-8B, schematic illustrations of a portion of a rotor assembly 800 in accordance with an embodiment of the present disclosure are shown. FIG. 8A illustrates a portion of an end portion 802 of the rotor assembly 800 which may be arranged with inner and outer diameter portions to form the rotor assembly 800, as shown and described above. FIG. 8B illustrates an enlarged illustration of a fan blade 804 of the end portion 802. As shown in FIG. 8A, a plurality of the fan blades 804 extend radially outward from the end portion 802. The fan blades 804 are defined by a leading edge 806, a trailing edge 808, a pressure side 810, and a suction side 812. The leading edge 806 is oriented in the direction of rotation such that the leading edge 806 of the fan blades 804 will cut into cooling flow (e.g., as shown in FIG. 7B) and drawn the cooling flow along the surfaces of the fan blades 804. The orientation and angle of the fan blades 804 may be set to ensure a desired throughflow of cooling air that is pulled through a stator cavity and directed axially downstream from the rotor assembly.

Furthermore, as discussed above with respect to FIGS. 5A-5C, the direction of flow is not limited to a single direction. For example, in FIG. 8A, the flow direction is to the right on the page (e.g., axially to the right). However, by reversing the direction of rotation of the end portion 802 or reversing the orientation/direction of the fan blades 804 with respect to the end portion 802, the flow direction may be the opposite of that shown. That is, the fan assemblies of the present disclosure are configured to induce a cooling flow through a stator cavity, but the direction of flow is not intended to be limited to the illustrative, example configurations.

Figure 9:
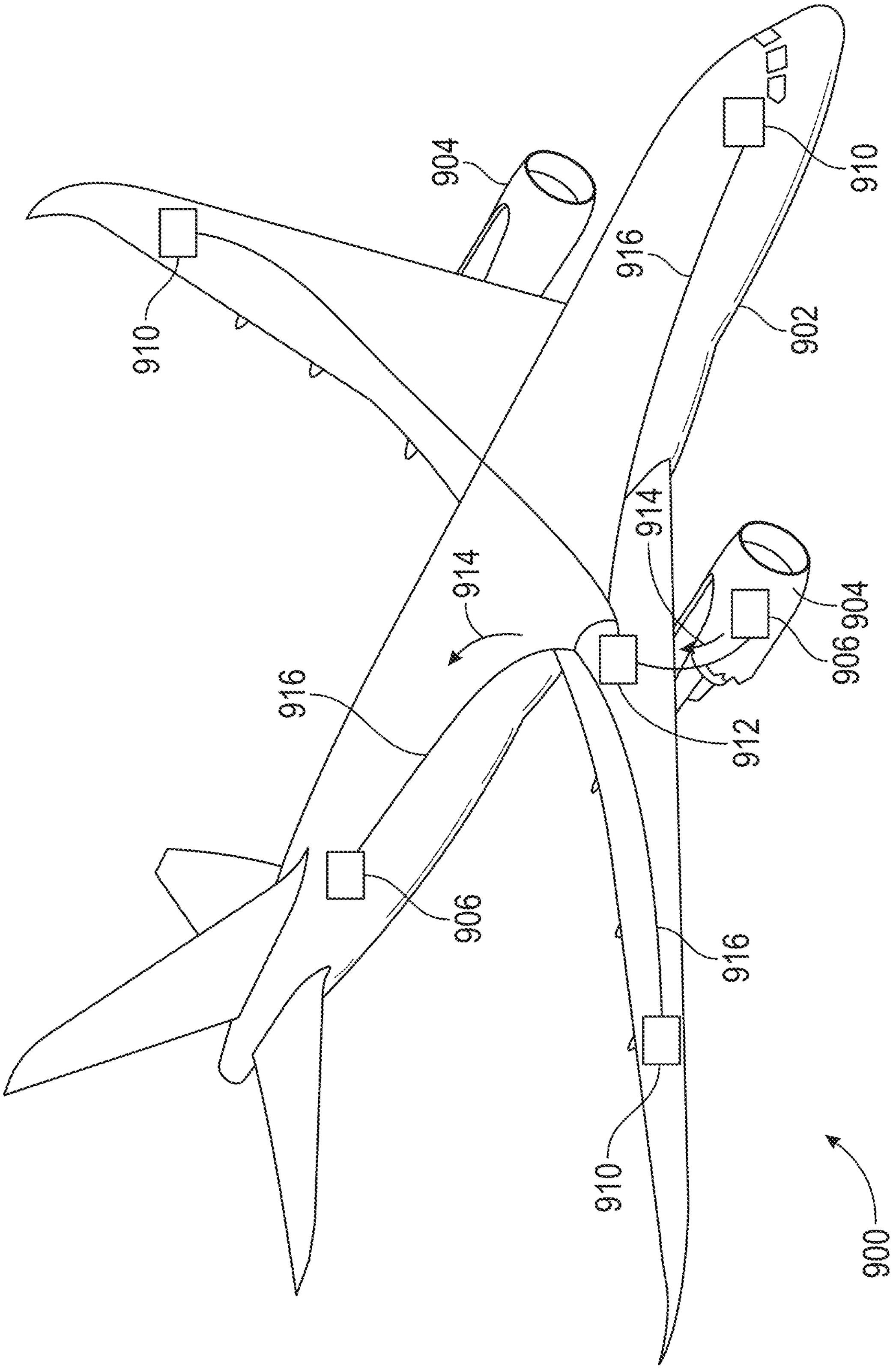
FIG. 9 is a schematic view of a power system of an aircraft that may employ embodiments of the present disclosure.

Referring now to FIG. 9, a power system 900 of an aircraft 902 is schematically shown. The power system 900 includes one or more engines 904, one or more electric machines 906 (e.g., electric motors), a power bus electrically connecting the various power sources 904, 906, and a plurality of electrical devices 910 that may be powered by the engines 904 and/or electric machines 906. The power system 900 includes a power distribution system 912 that distributes power 914 through power lines or cables 916. The electric machines 906 may be configured as the aircraft electric motors shown and described herein and/or incorporate features as described herein.

Advantageously, embodiments of the present disclosure provide for improved electric machines for aircraft and aviation applications. The aircraft electric machines of the present disclosure may provide for electric machines having reduced machine weight, increased efficiency, increased power density, and increased manufacturability. Advantageously, embodiments of the present disclosure are directed to fan assemblies integrated into the rotor assemblies of the electric machines to reduce Eddy current losses and to improve cooling of components of the electric machines (e.g., stator components, rotor components). In accordance with embodiments of the present disclosure, a fan assembly may be integrated in the rotor assembly. As such, rotation of the rotor assembly will cause rotation of fan blades of the fan assemblies, which in turn will draw or induce a cooling flow through the rotor assembly and around the stator assembly installed within the rotor assembly. In some embodiments, the fan assembly may be arranged at an outer diameter end of the rotor assembly (e.g., at an outer dimeter end of an end portion of the rotor assembly). In some embodiments, in combination with an outer diameter fan assembly or as an alternative, a fan assembly may be arranged at an inner diameter end of the rotor assembly. Such fan assemblies may improve airflow through the electric machine and may enhances extraction of heat loads generated due to electromagnetic losses from the rotor and stator assemblies.

In accordance with some embodiments of the present disclosure, the fan assemblies are arranged as structure features within or as part of an end portion of a rotor assembly, and thus may provide structural support and load transfer between various rotor components (e.g., between outer diameter, inner diameter, and end portions of the rotor assembly). The fan blades of the fan assemblies of the present disclosure may be shaped to improve efficiency and shape-optimized for Additive manufacturing, or the like. The fan assemblies, and the fan blades thereof, may ensure a level pressure drop to reduce uneven flow across the fan assemblies and to ensure even cooling flow through a stator cavity and thus provide cooling to surfaces/components of both a stator assembly and a rotor assembly of the electric machine. The operation of the fan assemblies and the cooling flow through the stator cavity may extract heat from rotor assembly surfaces and stator assembly surfaces and minimize hot spot temperatures. Accordingly, advantageously, embodiments of the present disclosure may enable increased power density and reduced magnet operating temperatures for electric machines.

The terms "about" and "substantially" are intended to include the degree of error associated with measurement of the particular quantity based upon the equipment available at the time of filing the application. For example, "about" or "substantially" can include a range of ±8% or 5%, or 2% of a given value. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. An aircraft electric motor comprising:

a rotor assembly comprises an outer diameter portion, and inner diameter portion, and an end portion, arranged to define a stator cavity, and a rotor hub configured to connect to a shaft of the aircraft electric machine;

a stator assembly arranged within the stator cavity; and at least one fan assembly defined in the end portion and configured to induce a cooling flow through the stator cavity, wherein the end portion includes an end portion support structure that houses end portion magnets and the rotor assembly further comprises: an outer diameter extension extending radially outward from the end portion support structure; an inner diameter extension extending radially inward from the end portion support structure; and the at least one fan assembly comprises: a first fan assembly arranged at an outer diameter end of the end portion and between the end portion support structure and the outer diameter extension; and a second fan assembly arranged at an inner diameter end of the end portion and between the end portion support structure and the inner diameter extension.

2. The aircraft electric motor of claim 1, wherein the at least one fan assembly is arranged at an outer diameter end of the end portion.

3. The aircraft electric motor of claim 1, wherein the at least one fan assembly is arranged at an inner diameter end of the end portion.

4. The aircraft electric motor of claim 1, wherein the at least one fan assembly comprises a first fan assembly arranged at an outer diameter end of the end portion and a second fan assembly arranged at an inner diameter end of the end portion.

5. The aircraft electric motor of claim 1, wherein the at least one fan assembly comprises a plurality of fan blades, wherein the plurality of fan blades provide structural support and load transfer within the rotor assembly between the inner diameter portion and the outer diameter portion through the end portion.

6. The aircraft electric motor of claim 1, wherein an inner diameter end of the end portion, the inner diameter portion, and the rotor hub are coupled together at a hub junction.

7. The aircraft electric motor of claim 6, further comprising a plurality of fasteners extending through and joining the end portion, the inner diameter portion, and the rotor hub together.

8. The aircraft electric motor of claim 1, wherein the outer diameter portion is coupled to the end portion by a plurality of fasteners.

9. The aircraft electric motor of claim 1, wherein:

the outer diameter portion comprises a set of outer diameter magnets, the inner diameter portion comprises a set of inner diameter magnets, and the end portion comprises a set of end portion magnets.

10. The aircraft electric motor of claim 9, wherein the outer diameter magnets, the inner diameter magnets, and the end portion magnets are arranged in a substantially U-shaped configuration defining the stator cavity.

11. The aircraft electric motor of claim 1, wherein the outer diameter portion comprises a flow control feature extending from an axial end of the outer diameter portion opposite the end portion of the rotor assembly, wherein the flow control feature is configured to direct a cooling flow into the stator cavity.

12. The aircraft electric motor of claim 1, wherein the inner diameter portion comprises a flow control feature extending from an axial end of the inner diameter portion opposite the end portion of the rotor assembly, wherein the flow control feature is configured to direct a cooling flow into the stator cavity.

13. The aircraft electric motor of claim 1, wherein the outer diameter portion comprises a first flow control feature extending from an axial end of the outer diameter portion opposite the end portion of the rotor assembly and the inner diameter portion comprises a second flow control feature extending from an axial end of the inner diameter portion opposite the end portion of the rotor assembly, wherein each of the first flow control feature and the second flow control features is configured to direct a cooling flow into the stator cavity.

14. The aircraft electric motor of claim 1, wherein the stator assembly comprises a plurality of windings arranged within the stator cavity.

15. An aircraft comprising: at least one aircraft electric machine; at least one electrical device; and a power distribution system configured to distribute power from the at least one electric machine to the at least one electrical device, wherein the at least one aircraft electric machine comprises:

a rotor assembly comprises an outer diameter portion, and inner diameter portion, and an end portion, arranged to define a stator cavity, and a rotor hub configured to connect to a shaft of the aircraft electric machine;

a stator assembly arranged within the stator cavity; and at least one fan assembly defined in the end portion and configured to induce a cooling flow through the stator cavity, wherein the end portion end portion includes an end portion support structure that houses end portion magnets and the rotor assembly further comprises: an outer diameter extension extending radially outward from the end portion support structure; an inner diameter extension extending radially inward from the end portion support structure; and the at least one fan assembly comprises: a first fan assembly arranged at an outer diameter end of the end portion and between the end portion support structure and the outer diameter extension; and a second fan assembly arranged at an inner diameter end of the end portion and between the end portion support structure and the inner diameter extension.

16. The aircraft of claim 15, wherein the stator assembly comprises a plurality of windings arranged within the stator cavity.

17. The aircraft of claim 15, wherein the at least one fan assembly comprises at least one of a fan assembly arranged at an outer diameter end of the end portion and a fan assembly arranged at an inner diameter end of the end portion.

18. The aircraft of claim 15, wherein the at least one fan assembly comprises a plurality of fan blades, wherein the plurality of fan blades provide structural support and load transfer within the rotor assembly.

19. The aircraft of claim 15, wherein:

the outer diameter portion comprises a set of outer diameter magnets, the inner diameter portion comprises a set of inner diameter magnets, and the end portion comprises a set of end portion magnets.

20. The aircraft of claim 15, wherein, at least one of:

the outer diameter portion comprises a first flow control feature extending from an axial end of the outer diameter portion opposite the end portion of the rotor assembly and configured to direct a cooling flow into the stator cavity along an outer diameter surface of the stator assembly, and the inner diameter portion comprises a second flow control feature extending from an axial end of the inner diameter portion opposite the end portion of the rotor assembly and configured to direct a cooling flow into the stator cavity along an inner diameter surface of the stator assembly.

* * * * *